(12) United States Patent
Yanai et al.

(10) Patent No.: US 11,102,179 B2
(45) Date of Patent: Aug. 24, 2021

(54) SYSTEM AND METHOD FOR ANONYMOUS MESSAGE BROADCASTING

(71) Applicant: VMware, Inc., Palo Alto, CA (US)

(72) Inventors: Avishay Yanai, Petach Tikva (IL); Ittai Abraham, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 57 days.

(21) Appl. No.: 16/748,571

(22) Filed: Jan. 21, 2020

(65) Prior Publication Data

US 2021/0226924 A1 Jul. 22, 2021

(51) Int. Cl.
*H04L 29/06* (2006.01)
*H04L 9/08* (2006.01)

(52) U.S. Cl.
CPC .......... *H04L 63/0421* (2013.01); *H04L 9/085* (2013.01); *H04L 63/1441* (2013.01)

(58) Field of Classification Search
CPC .. H04L 63/0421; H04L 9/085; H04L 63/1441
See application file for complete search history.

(56) References Cited

U.S. PATENT DOCUMENTS

| | | | | |
|---|---|---|---|---|
| 10,289,816 | B1* | 5/2019 | Malassenet | G06F 9/30036 |
| 2010/0017870 | A1* | 1/2010 | Kargupta | H04L 63/1408 |
| | | | | 726/14 |
| 2013/0114811 | A1* | 5/2013 | Boufounos | H04K 1/00 |
| | | | | 380/255 |
| 2017/0149796 | A1* | 5/2017 | Gvili | H04L 9/0625 |
| 2018/0337899 | A1* | 11/2018 | Becker | H04L 9/0852 |
| 2019/0370334 | A1* | 12/2019 | Bhowmick | G06N 5/025 |

OTHER PUBLICATIONS

Hei et al., Two Matrices for Blakley's Secret Sharing Scheme, Nov. 2012, IEEE International Conference on Communications, pp. 810-814 (Year: 2012).*
Alexopoulos, Nikolas et al. "Mcmix: Anonymous messaging via secure multiparty computation", In USENIX, 2017, 41 pgs.
Beerliova-Trubiniova, Zuzana et al. "Perfectly-secure MPC with linear communication complexity", In TCC, 2008, 18 pgs.
Chaum, David, "The dining cryptographers problem: Unconditional sender and recipient untraceability", J. Cryptology, 1(1): 1988, pp. 65-75.

(Continued)

*Primary Examiner* — Kenneth W Chang
(74) *Attorney, Agent, or Firm* — Loza & Loza, LLP

(57) ABSTRACT

A system and method for anonymous message broadcasting uses secret shares of a first vector of size i and a second vector of size j from each client device with a message in an anonymity set of client devices. Each secret share of the first and second vectors is received at each of a plurality of message broadcasting servers to construct a matrix M of i and j dimensions, which is added to a matrix A of i and j dimensions maintained at that message broadcasting server. The matrix A at each message broadcasting server is shared with the other message broadcasting servers and a final matrix A is constructed using the shared matrices A at each message broadcasting server, wherein the final matrix A includes the messages from the client devices in the anonymity set. The messages in the final matrix A are broadcasted from the message broadcasting servers.

20 Claims, 6 Drawing Sheets

(56) References Cited

OTHER PUBLICATIONS

Corrigan-Gibbs, Henry et al. "Riposte: An anonymous messaging system handling millions of users", In SOSP, 2015, 26 pgs.

Damgard, Ivan et al. "Scalable and unconditionally secure multi-party computation", In Crypto, 2007, 18 pgs.

Furukawa, Jun et al. "Two-thirds honest-majority MPC for malicious adversaries at almost the cost of semi-honest", ePrint Archive 2019, 33 pgs.

Gilboa, Niv et al. "Distributed point functions and their applications", In Eurocrypt, 2014, pp. 640-658, 2014.

Lu, Donghang et al. "Honeybadgermpc and asynchromix: Practical asynchronousmpc and its application to anonymous communication", eprint archive Report $^{2019}/_{883}$, 2019, 17 pgs.

Shamir, Adi, "How to share a secret", Commun. ACM, 22(11), 1979, 2 pgs.

Wolinksky, David Isaac et al. "Dissent in numbers: Making strong anonymity scale", In Usenix OSDI, 2012, 14 pgs.

\* cited by examiner

SYSTEM AND METHOD FOR ANONYMOUS MESSAGE BROADCASTING

BACKGROUND

Keeping communications private has become increasingly important in an era of mass surveillance and state sponsored attacks. While hiding the contents of a conversation has well-known solutions, hiding the associated metadata (e.g., the identities of the communicating parties, their location and timing participants, duration, etc.) remains a challenge. Most internet communication is encrypted today, which indeed guarantees content security. However, metadata security is not provided most of the time. Metadata security is particularly important, and in many cases as important as content security, when there is a desire to broadcast messages anonymously.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
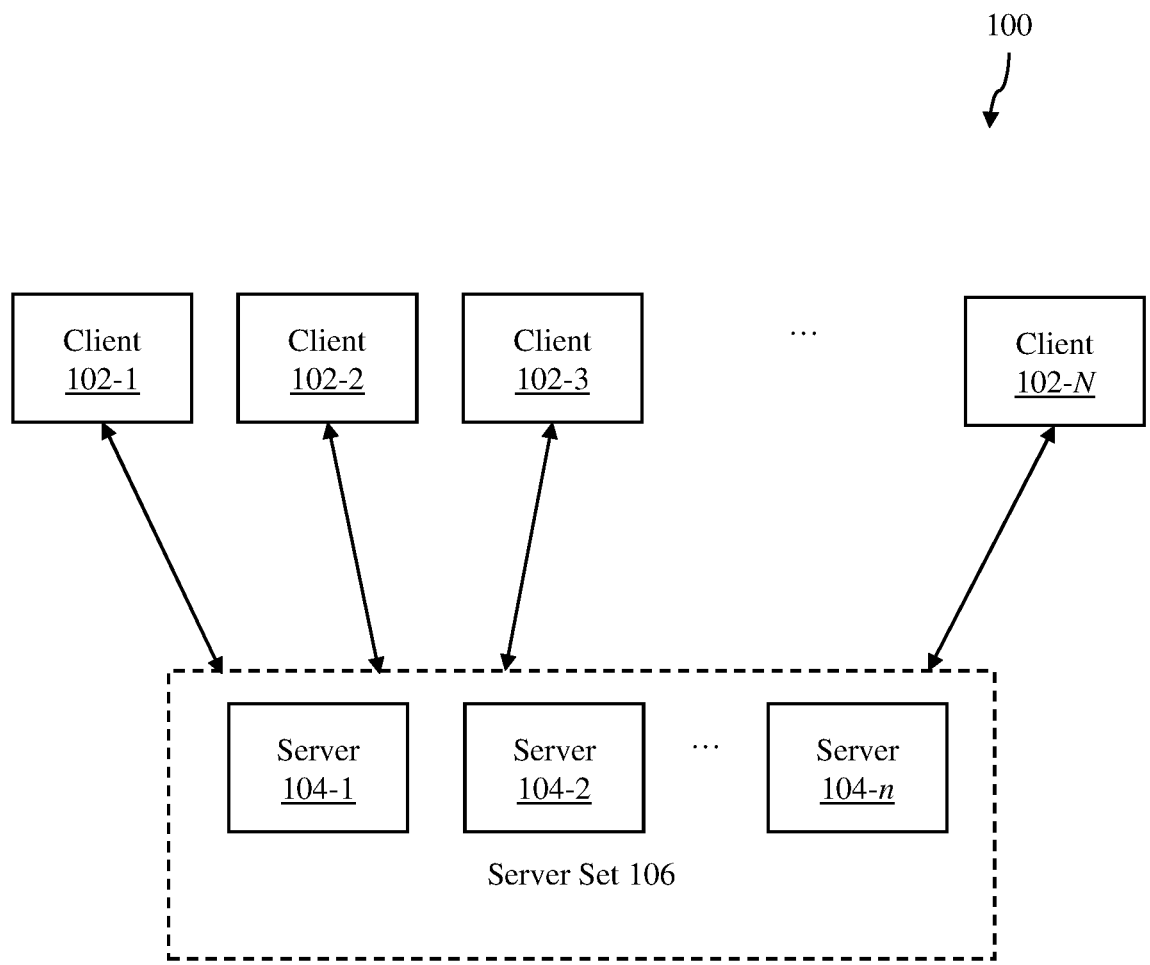
FIG. 1 is a block diagram of an anonymous message broadcast (AMB) system in accordance with an embodiment of the invention.

FIG. 1 shows an anonymous message broadcasting (AMB) system 100 in accordance with an embodiment of the invention. As shown in FIG. 1, the anonymous broadcast system 100 includes a number of client devices 102-1, 102-2, . . . , 102-N (referred to herein as "clients") and a number of message broadcasting servers 104-1, 104-2, . . . , 104-n (referred to herein as "servers"), which form a set 106 of message broadcasting servers 104. The anonymous broadcast system 100 allows the clients 102 to secretly send messages to the servers during a predefined period, where the messages from the clients are extracted and broadcasted together for each predefined.

The AMB system 100 allows the identity of a message's source to be hidden while withstanding global adversaries. The AMB system integrates state-of-the-art protocols for secure multiparty computation (MPC) with novel techniques for efficient format verification, as well as a new protocol that prevents a malicious server from "blocking" an honest client. The AMB system comes in two flavors, robust (i.e., guaranteeing liveness) and non-robust, each assuming a different limit to the adversary corruption power. In addition, the AMB system 100 has two implementation variants, based on using central processing units (CPUs) or graphics processing units (GPUs).

The AMB system 100 is based on MPC that works in the client-server model for anonymous committed broadcast of messages from the clients 102 with the servers 104 emulating a "message blending" task. Committed broadcast means that in each system's interval, all clients in an anonymity set send their messages, independent of other messages and without the ability to change or withdraw the messages. At the end of the interval (referred to herein as "epoch") all messages are revealed in one shot by the servers.

The AMB system has numerous potential applications, including front-running prevention, ameliorating differential privacy and protecting human rights, which are described below:

Front-running prevention. Decentralized exchanges (DEX) provide effective price discovery and fair trading, while doing away with the drawbacks of centralized exchanges. Trades are typically executed over smart contracts, which prevents an exchange operator to steal funds. By nature of smart contracts, the entire order book is public and transparent, which usually is a blessing, but may come with a fundamental weakness of front-running, or "transaction ordering dependence." This refers to the practice of entering into a trade to capitalize on advanced non-public knowledge of pending transactions. Adversaries can front-run orders by observing past and most recent orders and placing their own orders with higher fees to ensure they are mined first. Using the AMB system 100, in addition to protecting participants' identities, all transaction orders are committed during some time interval, at the end of which all of them are opened at once. This essentially removes the dependency between those transactions (since a cryptographic commitment has a hiding property). Note that this weakness is not necessarily related only to DEX, but to every platform that serves as a medium to the crowd, in which the operators wish to obtain independent inputs from users, e.g., a quorum that asks its users to provide a feedback on a certain service.

Differential privacy. Recent results in differential privacy analyzed the shuffle model, where users anonymously submit their private inputs to a server. This setup is a trust model which sits between the classical curator model, where a server knows the inputs of all clients and adds noise to answers to queries, and the local privacy model, where each client adds noise to its input. It was shown that the shuffle model provides substantially better tradeoffs between privacy and accuracy when aiming to achieve differential privacy. However, current works analyzed the advantages of this model without describing how it can be implemented. The anonymous broadcast system 100 essentially implements the anonymous channel that is assumed by the shuffle model.

Human rights and whistleblowing. The following quote can be found in some social science related studies: "anonymous communication is a fundamental component of a democratic culture and is critical to freedom of speech; it should be regarded as strong human right; in the US it is also a constitutional right." Except of being a basic human right, an immediate application for the AMB system 100 is enabling a prospective whistleblower, e.g., a government employee, to leak evidence of waste, fraud or incompetence to the public. The AMB system 100, when implemented efficiently, may serve as an infrastructure to more advanced communication means like dialing, peer-to-peer and group messaging.

The AMB system 100 follows the Dining Cryptographers (DC) network paradigm as it provides the strongest security guarantees. In particular, the AMB system 100 resists a traffic analysis by global adversaries that may monitor the entire network. However, deploying a pure DC network is prohibitively expensive for most use cases because it requires a full graph connectivity between all clients. Therefore, the AMB system 100 recedes to a more practical approach of a client-server DC-network, in which a group of servers, i.e., the servers 104, mediate clients' messages. Thus, instead of interacting with everyone in the anonymity set, a client 102 only has to interact with that group of servers. This relaxation has been proven itself in a series of works that demonstrate its practicality. However, these solutions still suffer from severe performance limitations with the bottleneck being either computation and/or round complexity.

Typically, the servers in such systems collect messages from N clients and then invoke some secure shuffling protocol. Afterwards, the servers open the permutated set of messages, which breaks the link between a message and its source client. The AMB system 100, on the other hand, borrows the idea of Private Information Write (PIW). In PIW, a single server maintains a matrix (e.g., a matrix of size $\sqrt{O(N)} \times \sqrt{O(N)}$, where N is the number of clients) of messages, encrypted under some key. For the ease of exposition, suppose that this key is known to all clients but not to the server, and that the encryption is additively homomorphic. The server allows clients to obliviously write to a single entry in that matrix by submitting a matrix with all entries contain encryptions of 0 except one entry, picked randomly by the client, that contains an encryption of its message. Since the key is not known to the server, it cannot tell into which entry the client has written. Upon receiving a client request, the server adds the client's matrix to the matrix it maintains via entry-wise addition. At the end, the server opens all N entries, without being able to link messages to their sources. The clients are also not able to link messages to their sources, assuming the clients do not collude with the server.

The AMB system 100 emulates that central server using a secure multiparty computation (MPC), such that instead of a single server there is a group of n servers, of which at most t may be corrupt and colluding. Also, instead of encrypted messages, clients share their messages to all servers using a threshold secret sharing scheme, e.g., Shamir's threshold secret sharing scheme, which guarantees that a collusion of up to t servers could not reveal the messages. For each message shared to the servers, the servers securely perform the PIW functionality, which puts the message in a secret entry in a matrix distributively maintained by them. Security is guaranteed against malicious (active) behavior of either the clients or the servers.

In PIW, the client submits a database (or a matrix) with N entries, which includes its message at the desired entry and 0 in all other entries. In the AMB system 100, each client 102 encodes its input much more succinctly, as two $\sqrt{O(N)}$-size vectors. The Cartesian product of these vectors is equal to a matrix which has the client's message in one entry and 0 in all other entries. Thus, each client's request is directly translated to a secure product of two vectors by the servers. In most MPC protocols, the computation and communication complexities are at least linear in the size of the circuit (number of "+" and "x" gates), which results in a $O(N^2)$ computation and server-to-server communication overall for all N clients. Until now, it was believed that such a solution is clearly not scalable. However, even though the size of the circuit that computes the Cartesian product is $O(N^2)$, the communication complexity, surprisingly, remains linear in N. Some known MPC protocols have a special property: a sum of products operation has the same communication complexity as a single "x" gate. Carefully using this property requires one to re-design the arithmetic circuit that the servers securely compute, such that the new circuit is represented as a full matrix multiplication. Then, instead of handling each client individually, the servers can process all clients together, with each entry of the result matrix (there are N such entries) being equal to the result of a single sum of product of values from all the clients. This reduces the server-to-server communication complexity dramatically from $O(N^2)$ to only $O(N)$, which constitute a significant performance and robustness improvement in the client-server DC-network paradigm.

As noted above, the AMB system 100 is designed to have security against malicious behavior. The AMB system comes in two implementations or flavors: robust and non-robust. Security against malicious behavior is guaranteed as long as no more than ¼ of the servers, for the robust version, or no more than ½ of the servers, for the non-robust version, are malicious and colluding. With less than ¼ of the servers corrupted, the AMB system features full robustness, in contrast to previous works that feature fairness only.

The AMB system 100 extends PIW from three servers to any number of servers with comparable performance, by proposing novel techniques for message format verification. In addition, the AMB system supports two implementation variants, based on the usage of CPUs or GPUs. Both variants provide true practical scalability with regards to the number of servers or clients and the message size. Using a careful design and usage of the underlying MPC protocol, the GPU variant reduces the heavy computational task of the servers to simply computing a matrix multiplication, for which there already exist highly optimized GPU implementations (e.g., CUTLASS). This variant is very attractive as it may run on any commodity machine equipped with a GPU, resulting in unprecedented performance for such a system. Here are some examples for the performance of the system: With 1 million clients, 3 servers and message sizes of 32 B and 160 B, the GPU variant incurs a latency of 2.5 and 6 minutes, respectively. With $10^4$ clients and 3 servers the CPU variant incurs a latency of less than 1.5 minutes for 10 KB files.

It is noted here that using a GPU does not immediately improve previous results for the following reasons: (1) Solutions that heavily rely on advanced encryption standard (AES) have a huge advantage of using CPU's intrinsics. Performing AES over a GPU is at least 95 times slower than performing finite field arithmetics (as required by some of the protocols executed by the AMB system 100) on a given data stream; (2) Protocols that rely on public-key primitives are expected to work even slower. It is noted here that even though the cloud pricing of GPU-equipped machines is more expensive than their CPU-only counterparts, the cost per epoch remains almost the same.

A feature of the AMB system 100 is that increasing the number of servers 104 in the system incurs only a marginal penalty on the latency. For example, with 105 clients, increasing the number of servers from 3 to 13 increases latency by only 6.5% and further increasing the number of servers to 21 servers increases latency by an additional 2%. Also, client messages are simply computed via secret sharing scheme, e.g., Shamir's secret sharing scheme, which involves fast field operations.

Another feature of the AMB system 100 is its ability to prevent "client-blocking attacks", which is a general attack on non-robust anonymous broadcast protocols. Say that N clients 102 are interacting in the AMB system in a given epoch, of which $N_c$ clients are controlled by the adversary and $N_h = N - N_c$ are not. Previous protocols merely assume that $N_h > 2$. However, this is insufficient, since if the corrupted servers can undetectably block clients, the servers may dramatically reduce the actual anonymity set to $N_h' \ll N_h$. In its extreme, the servers could block $N_h - 1$ of the clients, exposing the last honest client to full deanonymization.

The AMB system 100 uses a novel input-protocol that prevents client-blocking. This protocol preserves the information theoretic security of the AMB system, at the price of increasing the round-complexity to be logarithmic in the number of servers, which is described in more detail below.

The AMB system 100 eliminates the need for a third server, as described in Riposte (see "Riposte: An Anonymous Messaging System Handling Millions of Users" by Henry Corrigan-Gibbs, Dan Boneh, and David Mazières).

The trust assumption in Riposte's fast version is weakened. That is, Riposte requires three (non-colluding) servers. Riposte's core idea of distributed point function (DPF) essentially works with only two servers. However, in order to verify that a client write-request is well-formed (i.e., that the client does not cheat), it uses a third, non-colluding server). The AMB system eliminates this third server by integrating an efficient two-party private set intersection cardinality protocol (PSI-CA) in a verification scheme.

Furthermore, the verification scheme of the AMB system 100 is more efficient and incurs a communication of only $O(\lambda)$ per client, whereas Riposte's scheme incurs a communication of $O(\sqrt{O(N)})$, where $\lambda$ is the statistical security parameter and N is the number of clients (i.e., anonymity set size).

Before describing the AMB system 100 in more detail, a comparison to works closest to model or techniques of the system is presented.

Metrics used to measure anonymous broadcast protocols that follow the DC-net paradigm are divided into two categories: trust assumptions/security guarantees and performance/scalability. The following questions are interesting in the client-server model: how many servers participate in the protocol and how many may maliciously collude, without breaking security guarantees?; what are the cryptographic assumptions?; is a corrupt server able to block an honest client?; and is the system fair/robust? With regard to performance, computation and communication (both client↔server and server↔server) are of interest as well as the number of communication rounds. In addition, one should examine whether the number of servers and clients can be practically increased. The most relevant works for comparison to the anonymous broadcast system 100 are Riposte, AsynchroMix/PowerMix and McMix.

Riposte is the state-of-the-art protocol for client-server-based DC-network with regards to throughput and client-scalability. It has a 3-party and a multi-party versions. The 3-party version is the only one which is fully implemented and practical, assuming no collusions. Riposte is based on distributed point functions (DPF) (which are related to private information storage and 2-server private information retrieval (PIR). This allows Riposte to heavily rely on modern processors' intrinsic instructions for computing AES. However, it does not scale efficiently to more than 3 servers. McMix and AsynchroMix/PowerMix both rely on generic honest-majority MPC protocols. McMix implements a shuffling protocol that works efficiently only for 3 semi-honest servers. That protocol, as well, cannot be efficiently extended to more than 3 server. AsynchroMix and PowerMix scale beyond the 3 servers limit, are secure against a malicious adversary and assume that less than a third of the servers collude. Thanks to that trust assumptions of collusion, these solution also enjoys fairness. These protocols, however, do not scale efficiently to more than a few thousands clients due to the fact that AsynchroMix has a high round complexity and PowerMix runs a $O(N^3)$ computational task of solving power equations.

As used herein, the set 1, ..., x is denoted by [1;x]. Indexes begin at 1 unless explicitly stated otherwise. $\lambda$ is the statistical security parameter. A function $\mu: \mathbb{N} \to \mathbb{R}$ is negligible, if for every positive polynomial poly(•) there exists an integer $N_{poly}$ such that for every $x > N_{poly}$, it holds that $|\mu(x)| < 1/N_{poly}(x)$. A negligible probability is referred to as $\mu(x)$ for some security parameter x. In addition, an overwhelming probability is referred to as $1 - \mu(x)$.

The AMB system 100 runs on a set of n servers $S_1, \ldots, S_n$ (i.e., the servers 104-1, 104-2, ..., 104-n) of which t servers may be malicious and colluding. The operation of the AMB system is divided into "epochs", where in each epoch, a set of N clients (i.e., the client 102-1, 102-2, 102-3, ..., 102-k), denoted $C^1, \ldots, C^N$, (referred to herein as "the anonymity set") interact with the system to submit their messages of size L bytes. It is assumed that there are secure channels having authenticated encryption with forward secrecy between all participants (i.e., clients and servers for client-servers and server-server communications).

It is assumed that the adversary may corrupt up to t servers and up to N−2 clients. When $n/4 \leq t < n/2$, a corrupted server may halt the execution (e.g., using Denial of Service (DoS) attack). However, when $t < n/4$, the anonymous broadcast system 100 is robust and, in particular, DoS is not possible. In both cases, anonymity is preserved. A client may never cause the AMB system 100 to halt, but may pass the format verification check with malformed message with negligible probability in $\lambda$.

In an embodiment, the AMB system 100 implements an anonymous bulletin board A, which has the form of a matrix, by letting each client, C, blindly submit a message m, of a fixed size L, into a single randomly picked entry of the matrix A. The matrix A is distributively maintained by the servers 104 via a cryptographic secret sharing scheme, e.g., Shamir's secret sharing scheme. Therefore, at the time of message submission, each server does not see the message m but rather a blinded version of the message m from which it cannot learn anything, neither the actual message nor the entry into which it is written. In fact, even if t servers collude, these servers are incapable of revealing the message m or its position in the matrix A. The matrix A is continuously updated upon each message submission and is opened only at the end, i.e., after all clients submitted their messages, so everyone can see the messages in all entries.

To blindly submit a message m to a specific entry, a client C "embeds" the message m in a matrix M with the same dimensions as the matrix A. All entries in the matrix M except one contain 0, and the remaining entry contains the message m. The client C then asks the servers, by secret sharing of M's entries, to update their bulletin board by computing $A \leftarrow A+M$, which clearly changes only one entry in the matrix A. This means that for each client, the servers write to all entries of the matrix A, and since the servers only see shares of the matrix M, the servers learn nothing from that operation. After all clients submitted their messages, the servers reveal all A's entries. At this stage they indeed see all messages but are not able to link a message to its source.

The clients 102 are completely untrusted: the clients may submit malformed messages to the system 100 and may collude with servers 104 or with arbitrarily many other clients. At most n-t of the servers are trusted. When $t < n/4$, this is sufficient for availability (robustness). When $t < n/2$, the t corrupted servers may break availability, which renders the system's state unrecoverable by honest participants, but still do not compromise the anonymity of the clients. No assumptions are made on the behavior of malicious servers, which can misbehave by leaking their secrets, colluding with coalitions of up to t malicious servers and arbitrarily many clients, or by mounting any other sort of attack against the system.

In the following, definitions are provided, some of which are adopted from "Riposte: An Anonymous Messaging System Handling Millions of Users" by Henry Corrigan-Gibbs, Dan Boneh, and David Mazières.

Definition 1 (Correctness). The protocol is correct if, when all servers are honest, at the end of the protocol the matrix of secrets maintained by the servers is distributed identically to a zero-initialized matrix that results by adding each message to a randomly picked entry.

Write Privacy. Intuitively, the system provides (n, t)-write-privacy if an adversary's advantage at guessing which honest client wrote to a particular matrix entry is negligibly better than random guessing, even when the adversary controls all but two clients and up to t of n servers.

The AMB system 100 provides a very strong notion of privacy as long as $t < n/2$: the adversary can select the messages for the honest clients and can send maliciously formed messages adaptively. Even then, the adversary still cannot guess which client uploaded which message.

Definition 2 ((n, t)-Write Privacy). A protocol is said to provide (n, t)-write privacy if the adversary's advantage in the security game described "Riposte: An Anonymous Messaging System Handling Millions of Users" is negligible in the (implicit) security parameter.

Fairness and Robustness. In the context of MPC, a protocol is said to be fair if the corrupted parties obtain their output only if the honest parties obtain their output. This is a desirable, and sometimes a necessary, property from a protocol. Consider for example a two-party coin-toss protocol where the first party wins if the result is 0 and the other wins if the result is 1. Using an unfair protocol (where a malicious first party learns the output but the honest second party does not) completely breaks the security because if the result is 1, the first party can abort (behaves like there was a connection error) and re-initiate the protocol, thereby always winning. Robustness is a stronger property in which the honest parties learn their output independently (which prevents the attack on the coin-toss). Fairness and robustness are now defined in the context of anonymous broadcast:

Definition 3 (Fairness). An anonymous broadcast protocol is fair if a matrix entry revealed to the adversary only if it is also revealed to the honest parties.

Definition 4 (Robustness). An anonymous broadcast protocol is robust if all matrix entries are always opened to the honest parties, independent of the adversary's behavior.

Disruption resistance. A system is disruption resistant if an adversary who controls N' clients can write into at most N' matrix entries during a single time epoch. A system that lacks disruption resistance is susceptible to DoS attacks: a malicious client could corrupt multiple matrix entries with a single write request. Thus, a mechanism for disruption resistance (also called herein as "message format verification"), is necessary. Disruption resistance is defined via the following game, played between a challenger and the adversary, taking the roles of honest servers and corrupted servers, respectively.

Challenger and adversary run the anonymous broadcast protocol with all n servers.

The adversary having full control of at most t corrupted servers sends N' write requests to the system.

Challenger's and adversary's servers, which received and processed the N' write requests, combine their servers' states to reveal all matrix entries (i.e., the matrix A entries). The adversary wins the game if the output matrix contains more than N' non-zero entries.

Definition 5 (Disruption Resistance). A protocol is said to be disruption resistant if the probability that an adversary wins the game above is negligible in an implicit security parameter.

Before describing the protocol of the AMB system 100 in detail, a simple "straw man" construction is described that demonstrates the techniques behind the system protocol. However, the notion of a threshold linear secret sharing scheme is first described as a prelude to the simple "straw man" construction.

An (n,t)-threshold secret sharing scheme (TSS) allows a client C with a secret s, which is an element from some finite field $\mathbb{F}$, to share s to n receivers $S_1, \ldots, S_n$ such that $S_i$ receives the share $s_i$. The scheme is private if a coalition of up to t receivers cannot learn any information about s from their shares. The scheme is correct if any subset of t+1 honest receivers can reconstruct the secrets from their shares. The scheme is robust if honest receivers can reconstruct the secret s after an interaction between all n receivers. Among the receivers, there are up to t maliciously behaving receivers. This property ensures that malicious receivers cannot prevent honest receivers from learning the secret.

The sharing of a secret s is denoted by $(s_1, \ldots, s_n)$ or simply by [s]. The protocol of sharing secret s toward n servers is denoted by $\{s_q\}_{q \in [1,n]} \leftarrow \text{Share}(s)$. The protocol for reconstructing a secret from shares provided by n servers by which all honest servers learn s' is denoted by $s' \leftarrow \text{Reconstruct}(\{s'_q\}_{q \in [1,n]})$. If $s'_{i_1}, \ldots, s'_{i_{n-t}}$ are a result of Share(s) for some s, where $s_{i_1}, \ldots, s_{i_{n-t}}$ are the honest servers, then: (1) if the scheme is robust, it follows that s'=s; (2) otherwise, $s' \in \{s, \bot\}$, depending on the shares provided by the corrupted servers. In the latter case, corrupted servers may learn the secret s even though the honest servers learn $\bot$ (there is no fairness), which is equivalent to an "abort" request. Note, however, that honest servers never learn a wrong value $s' \notin \{s, \bot\}$.

Jumping ahead, it is noted here that when t<n/2, the scheme is not fair and not robust, whereas when t<n/3, the scheme is robust. However, the anonymous broadcast system 100 use t<n/4 for the robust version since the degree of the underlying polynomial is doubled when two sharings are multiplied. Hence, to have a robust sharing of the product, t<n/4 is required.

A threshold linear secret sharing scheme (TLSS) is a TSS in which [a]+[b]=[a+b]. Namely, a receiver $S_i$, given $a_i$ and $b_i$ as the shares of a and b, can compute a valid share of c=a+b by locally computing $c_i = a_i + b_i$ ("locally" means that $S_i$ does not need to interact with other receivers in order to obtain a share of c). More generally, given $a_i$ and $b_i$ as shares of a and b, a receiver $S_i$ can locally obtain a valid share of $c = \alpha \cdot a + \beta \cdot b$ for public constants $\alpha, \beta \in \mathbb{F}$ by locally computing $c_i = \alpha \cdot a_i + \beta \cdot b_i$. By induction, this could be further generalized to any linear operator on a vector of sharings.

An implementation of the AMB system 100 can be constructed directly from a TLSS as follows. Let N be the supported anonymity set size, or alternatively, the number of messages submitted to the system in a given epoch. The matrix A distributively maintained by the servers has rows and cols columns such that rows×cols≥N (i.e., it has sufficient room for all messages). The entry in the i-th row and j-th column is denoted by $A_{(i,j)}$. Each entry of the matrix A is a sharing [s], i.e., server $S_q$ holds $s_q$ in its locally maintained matrix $A_q$. Suppose, for simplicity, that messages consist of a single field element. However, this, this is easily extended to messages of arbitrary length.

Submitting a message. To submit message $m \in \mathbb{F}$, a client C picks random indices $i^* \in [1, \text{rows}]$ and $j^* \in [1, \text{cols}]$ and prepares a matrix M of size rows×cols such that:

$$M_{(i,j)} = \begin{cases} m & \text{if}(i, j) = (i^*, j^*) \\ 0 & \text{otherwise} \end{cases} \quad \text{Equation (1)}$$

Then, C calls Shares($M_{(i,j)}$) for every (i,j) by which server $S_q$ obtains $M_{(i,j),q}$. M is called the "blinded" version of m as the servers that receive entry-wise shares of M learn nothing about neither m nor (i*,j*).

During submission time, N clients prepare blinded messages, so that client $C^k$ with message $m^k$ prepares a matrix $M^k$ as its blinded message and shares each of its entries between all servers. $S_q$ share of the (i, j)-entry is denoted by $M_{(i,j),q}^k$, and all the shares it receives from $C^k$ is denoted by $M_{(\cdot,\cdot),q}^k$.

Processing and revealing all messages. After all blinded messages are submitted, the servers proceed to reveal the aggregation of all of them. This is possible due to the linearity of the secret sharing scheme. Each server $S_q$, given shares of blinded messages $M_{(i,j),q}^1, \ldots, M_{(i,j),q}^N$ from all N clients, computes the sum of the shares. Namely, for every (i,j), $$A_{(i,j),q} = \sum_{k=1}^{N} M_{(i,j),q}^k \quad \text{Equation (2)}$$

Note that for every (i,j), $A_{(i,j),q}$ is a share of the sum of values that all clients put in the (i,j) entry of their tables.

The servers run $A_{(i,j)} \leftarrow \text{Reconstruct}(\{A_{(i,j),q}\}_q)$ for every (i,j), to reveal the aggregated matrix A, which contains all clients' messages.

Handling collisions. Suppose that only one client picked some entry (i*,j*) for its message $m^k$, then it follows that $M_{(i^*,j^*)}^k = m^k$ and $M_{(i^*,j^*)}^{k'} = 0$ for every k'≠k. Thus, the value $A_{(i^*,j^*)}$ that s reconstructed by the servers is equal to $m^k$, and the message of $C^k$ is broadcast successfully. On the other hand, if there are several clients, $C^{k_1}, \ldots, C^{k_c}$ that picked (i*, j*), then $A_{(i^*,j^*)} = m^{k_1} + \ldots + m^{k_c}$, which is considered a collision. To deal with collisions, the following technique is applied. Instead of only one matrix, client C prepares two matrices: the matrix M as before, and a new matrix $\hat{M} = M = 0$ except for the entry (i*,j*) picked by the client C, where $M_{(i^*,j^*)}^k = m$ and $\hat{M}_{(i^*,j^*)} = m^2$. The servers now distributively maintain two matrices: the matrix A that aggregates messages $\hat{M}^k$ and $\hat{A}$ that aggregates messages $\hat{M}^k$. Now, if there are two clients $C^{k_1}$ and $C^{k_2}$ that picked the same entry (i*,j*), then $A_{(i^*,j^*)} = m^{k_1} + m^{k_2}$ and $\hat{A}_{(i^*,j^*)} = (m^{k_1})^2 + (m^{k_2})^2$. Using these two equations, it is easily possible to find $m^{k_1}$ and $m^{k_2}$: In a prime field $\mathbb{F}_p$ when p mod 4=3, for a given $b \in \mathbb{F}_p$, $b = x^2$ can be solved by computing $x_1 = b^{(p+1)/4}$ and $x_2 = -x_1$. This incurs a cost of log p−2 finite field multiplication, by computing the repeated powers of b, i.e., b, $b^2$, $b^4$, ..., $b^{(p+1)/4}$.

This technique works as long as an entry aggregates at most two messages, and fails if three or more messages are mapped to the same entry. Having a matrix of size at least 2.7N, this procedure finds at least 95% of the messages (i.e., the rate is 5%). The technique could be easily extended to solve collisions of more than two clients.

The computational complexity of the above protocol is $O(N^2)$ field additions for a given epoch. The server-to-server communication is minimal. That is, the servers interact only for reconstructing the secrets of the entries of A and Â, which incurs only O(N) communication overhead per server. In contrast, the overall clients-to-servers communications in a given epoch is $O(N^2)$ (i.e., shares of size O(N) from N users). This communication volume quickly becomes the bottleneck of the protocol as N grows. Therefore, there is interest in a protocol that improves this metric, i.e., drastically reduces client-server communications, while admitting some extra computation on the server side and allowing server-server communications (apart from the reconstruction).

Fortunately, using recent techniques from secure multiparty computation (MPC), the servers are able to locally multiply shares of secrets in order to obtain a share of their product. That is, given $a_q$, $b_q$ as shares of a, b, respectively, $S_q$ can compute a valid share of c=a·b by locally computing $c_a = a_q \cdot b_q$. In the protocol of the AMB system 100, this will enable clients to submit a short row vector and a short column vector, each of size (O√N), and have the servers compute the matrix resulting from multiplying these vectors. For the case of t<n/4, the multiplication is fully secure (robust), i.e., a reconstruction would certainly output the value c=a·b. Therefore, the rest of the description is devoted to the case of n/4≤t<n/2.

It has been shown that, for the setting of t<n/2, Shamir secret sharing scheme is somewhat multiplicatively homomorphic. This is due to the following reasons:

1. Suppose there are the sharings [a]; [b] of degree d (i.e., a (n,d)-threshold secret sharing with a reconstruction threshold of d+1). It is possible to locally multiply the sharings in order to get a sharing of their product, [c] where c=a·b. However, the resulting [c] is of degree 2d, which is impossible to further use as a multiplicand in a local multiplication of sharings (as local multiplication requires both multiplicands to be of degree d). Transforming [c] to be of degree d incurs some interaction between the servers. That is, there exists a protocol $\{c'_q\}_q \leftarrow \text{Renew}(\{c_q\}_q)$ that takes a sharing [c] of degree 2d and outputs a sharing [c'] of degree d, such that c'=c if the servers are honest.

2. An adversary may mount an additive attack; namely, it can provide incorrect $c'_q$ shares, such that executing $\{c'_q\}_q \leftarrow \text{Renew}(\{c_q\}_q)$ not necessarily results in a sharing of c=a·b but rather c'=a·b+ε where ε∈ 𝔽 can be chosen arbitrarily by the adversary, rendering the local multiplication insecure. An additive attack is the only one possible in this setting.

An insecure protocol for multiplication is denoted by [c']←Mult([a], [b]) with c'=a·b+ε as described above. That is, Mult is a protocol that encapsulates a local multiplication of shares $a_q$ and $b_q$ to get a shares $c_q$ of c=a·b, followed by executing Renew ($\{c_q\}_q$) to obtain [c'].

To overcome the above issues, a recent work described introducing authentication of all shares in the computation, using a global random sharing of a MAC key [R]. Specifically, every share [x] in the course of the computation (e.g., inputs, intermediate values and outputs) is authenticated by having the servers also maintain the sharing [R·x]. The idea is that if an adversary manages to modify the sharing of some product, from [x] to [b+ε], then it also has to modify its authentication, from [R·x] to [R·(x+ε)]=[R·x+R·ε)]; but this is possible only with negligible probability since R is sampled uniformly and privately from 𝔽, i.e., a multiplicative attack, rather than additive attack, is required. Then, a secure version of Mu/t, denoted by SMult, encapsulates invoking [c']←Mult([a], [b]) and [c"]←Mult([R·a], [b]), and then invoking Renew on both [c'] and [c"]. Finally, they invoke a verification procedure that checks that c"=R·c' and aborts if it fails.

In addition, it was also observed that the communication cost for computing the sum of products is exactly the same as for computing a single product. That is, given the sharings $[u^1], \ldots, [u^l]$ and $[v^1], \ldots, [v^l]$ and the public constants $\alpha^1, \ldots, \alpha^l$ and β, the servers can compute the sharing [c] where $$c = \beta + \sum_{k=1}^{l} (\alpha^k \cdot u^k \cdot v^k),$$

with the same communication overhead as computing a single multiplication. This operation, as well, has a secure and insecure versions, denoted by c←SSOP($\{u^k \cdot v^k \cdot \alpha^k\}$,β) and c'←SOP($\{u^k \cdot v^k \cdot \alpha^k\}$,β), respectively, where c is as above, but c' equals c+ε for an arbitrary ε∈ 𝔽 chosen by the adversary.

Below described how these properties are used to improve the protocol of the AMB system 100. For simplicity, suppose that N is a perfect square and rows=cols=√N. In addition, the size of the matrix is not extended by a factor of 2.7.

Submitting a Message. Instead of a full matrix M of size O(N), a client C prepares its blinded message as two vectors: a row vector r of size cols and a column vector c of size rows, with elements from 𝔽. The i-th coordinate of r and c, respectively, is denoted by $r_i$, $c_i$.

A client C with a message m randomly picks (i*,j*) and assigns $c_{i^*}=1$, and $c_i=0$ for every i≠i*. In addition, the client C assigns $r_{j^*}=m$, and $r_{j^*}=0$ for every j≠j*. Observe that c×r is exactly the matrix M from Equation (1). Similarly, C prepares vectors r̂ and ĉ instead of the matrix M̂, where $\hat{c}_{i^*}=1$, and $\hat{c}_i=0$ for every i≠i*; $\hat{r}_{j^*}=m^2$, and $\hat{r}_j=0$ for every j≠j*. Vectors (r, c) and (r̂, ĉ) constitute the new blinded message.

The client C shares those vectors to all servers. The share of the i-th coordinate of vector x sent to server $S_q$ is denoted by $x_{i,q}$, or use $x_{i,q}^k$ to indicate that client $C^k$ sends that share. To refer to $S_q$'s share of the entire vector, $x_q$ is used.

Processing and revealing all messages. Given the shares $r_q^k, c_q^k$ and $\hat{r}_q^k, \hat{c}_q^k$ from client $C^k$, server $S_q$ first computes $M_{(i,j),q}^k = c_i^k \cdot r_j^k$ and $\hat{M}_{(i,j),q}^k = \hat{c}_i^k \cdot \hat{r}_j^k$ for every i,j, obtaining the matrices $M_{(\cdot,\cdot),q}^k$ and $\hat{M}_{(\cdot,\cdot),q}^k$ for all k∈[1,N]. The server then proceeds, exactly as described above with respect to a straw man construction, reconstructing the aggregated matrices A and Â of all messages. Namely, server $S_q$ inputs $$A_{(i,j),q} = \sum_{k=1}^{N} M_{(i,j),q}^k \text{ and } \hat{A}_{(i,j),q} = \sum_{k=1}^{N} \hat{A}_{(i,j),q}^k$$

to the Reconstruct protocol. Note that this is exactly the sum-of-product operation, i.e., by the servers 104, using the SSOP protocol, to compute:

$$A_{(i,j),q} = \sum_{k=1}^{N} M_{(i,j),q}^k = \sum_{k=1}^{N} (r_{i,q}^k \cdot c_{i,q}^k) \quad \text{Equation (3)}$$

for each entry (i, j) of the matrix A. The servers do the same for Â.

Efficiency. The protocol of the AMB system 100 reduces the size of a blinded message, from a full matrix of size O(N) to vectors of total size O(√O(N)). This comes at a price: first, obviously, instead of having only O(N²) field additions, there are now O(N²) field multiplications as well, which are more expensive than additions. Second, as mentioned above, to prevent the additive attack on the product of shares, the protocol above incurs computation and communication overhead which is a constant factor more expensive than the insecure multiplication.

Security. The protocol above can be described as an arithmetic circuit Circ, with N sum-of-product gates, operating on the client inputs $r^k, c^k, \hat{r}^k, \hat{c}^k$ for all $k \in [1, N]$, a total of $O(N \cdot \sqrt{N})$ field elements. Thus, simply applying known MPC protocols for the case of $n/4 \leq t < n/2$ and for the case of $t < n/4$ to Circ immediately renders the protocol of the system fully simulatable. This means that apart from collecting the anonymity set (i.e., identities of all clients) and revealing the outputs, which are the aggregated matrices A and $\hat{A}$, the corrupt servers learn no information that could not be learnt even without running the protocol.

Foreword security. Clearly, assuming servers delete blinded messages from their state after processing them, even an adversary who corrupts all servers cannot deanonymize clients of previous epochs. This is due to the fact that the only information the server obtains are the aggregated matrices A and $\hat{A}$, from which it is impossible to link a message to its source. Note that, even for the current epoch, if the adversary corrupts all servers after N'<N honest client messages were submitted, this is equivalent to an anonymous broadcast protocol with an anonymity set size N', since, again, the adversary obtains only the servers' current state, which is the aggregation of messages received so far.

Disruption Resistance. Even in case where $n/4 \leq t < n/2$ (in which a DoS attack initiated by malicious servers is allowed), the AMB system 100 is still protected against a client-initiated DoS, where a client sends a malformed input. An MPC protocol is now described for verifying that the client's blinded message is well formed. This protocol incorporates a novel sub-protocol for efficient unit vector verification, described below, which may be used in many other applications. In the following, some examples of what a malicious client can do are provided and the protocol of the AMB system 100 for detecting any malformed blinded message is presented.

Below are examples of what a malicious client can do:
Many corrupted clients may pick the same $(i^*, j^*)$ for their messages. By this, the adversary may damage the collision rate and success rate.

A malicious client may set non-zero values in $r_i$ for $i \neq i^*$ or in $c_j$ for $j \neq j^*$. This causes a "pollution" of the resulting matrix M and hence of the final matrix A. In fact, it may fill the entire matrix A with non-zero values. Having two malicious clients doing this is equivalent to a DoS attack as every message of an honest client will reside with at least two other messages and thus could not be extracted.

Even a client who writes to a single entry may damage the matrix and increase the loss rate of the system. For instance, it is possible to write m to $A_{(i^*, j^*)}$ and $m' \neq m^2$ to $\hat{A}_{(i^*, j^*)}$. This actually fills entry $(i^*, j^*)$ with 2 messages already and the message of an honest client who writes to $(i^*, j^*)$ will not be extracted.

Before describing an actual verification process of the AMB system 100 in accordance with an embodiment of the invention, some useful standard functionalities from the MPC literature are briefly described. In addition, new functionalities required for the application of the AMB system are introduced and how to securely and efficiently realize them is shown.

The following standard functionalities are the atomic building blocks in most efficient MPC constructions, along with the local addition and multiplication protocol described above. Only the functionalities are presented without their realizations.

Coin toss. The servers can sample a uniformly random public value $c \in \mathbb{F}$ or a random public bit $b \in \{0, 1\}$. Protocols realizing these functionalities are denoted by $c \leftarrow$ RandomPublic( ) and $b \leftarrow$ RandomPublicBit( ), where all servers learn c and b, respectively.

Random sharing. The servers can generate a sharing [r] of a uniformly random secret value $r \in \mathbb{F}$. A protocol realizing that is denoted by $[r] \leftarrow$ RandomSecret( ), where $S_q$ learns $r_q$.

Zero test. For a sharing [x], the servers can check whether x=0 without reconstructing x. This protocol is denoted by $z \leftarrow$ ZeroTest([x]), where z, learnt by all servers is 1 if x=0 and 0 otherwise.

In the following, new functionalities and protocols that securely realize them, which are used in the AMB system 100 in accordance with an embodiment of the invention are described. The correctness and security of the protocols are quite easy to see.

Unit-vector and unit-vector-multiple tests. The purpose of this test is to verify that a given vector of sharings $[x] = ([x_1], \ldots, [x_l])$ has at most one non-zero coordinate. The first test checks whether $x = e_i$ for some unknown $i \in [1, l]$, namely x is a unit vector with at most one non-zero element being equal to 1. The second test checks whether $x = c \cdot e_i$ for some unknown i and c (i.e., the i-th coordinate is [c]). Protocols for those functionalities are denoted $u \leftarrow$ UnitVector([x]) and $u \leftarrow$ UnitVectorMult([x]) with the output u (learnt by all servers) being 1 if $x = e_i$ or $x = e_i$, respectively, and 0 otherwise. A realization of those functionalities is now described:

Protocol UnitVectorMult: (Each iteration of this test divides the entries to two random subsets, and verifies that one of these subsets contains only zeroes) Repeat the following for every $j \in [1, \lambda]$:
1. Let $b_i \leftarrow$ RandomPublicBit( ) and $r_i \leftarrow$ RandomPublic( ) with non-zero $r_i$'s for every $i \in [1, l]$.
2. Locally compute:

$$[s_0] = \sum_{i=1}^{l} ((1 - b_i) \cdot r_i \cdot [x_i]) \text{ and } [s_1] = \sum_{i=1}^{l} (b_i \cdot r_i \cdot [x_i])$$

3. Run $[t] \leftarrow$ SMult($[s_0], [s_1]$) and $z \leftarrow$ ZeroTest([t]) and output z.

if z=1 for all $j \in [1, \lambda]$, then output 1, otherwise output 0.

Protocol UnitVector: (Run the previous test, and in addition verify that the sum of all entries is 1)
1. Invoke $u \leftarrow$ UnitVectorMult([x])
2. If u=0 abort, otherwise locally compute $$[z] = \sum_{k=1}^{l} [x_k]$$

and
run $z' \leftarrow$ Reconstruct([z]).

3. Output 1 if z=1 and 0 otherwise.

Unit vector shuffle. This functionality re-randomizes the non-zero element's position in the vector $x = c \cdot e_i$. That is, it is given $[x] = ([x_1], \ldots, [x_l])$ for $x = c \cdot e_i$ and outputs x' such that $x' = c \cdot e_j$ for a random $j \in [1, l]$. The functionality is realized by using a sub-protocol $[x'] \leftarrow$ ShiftLeft([x], r). That is, given a vector of sharings x and a random shift value r, it outputs the same vector, shifted to the left (this is a cyclic shift) by r positions. Then, the protocol for shuffling follows:

Protocol Shuffle(x):
1. invoke←RandomPublic( ) with r∈[1, 1].
2. run [x']←ShiftLeft([x], r) and output [x'].

Same position test. Given unit vector multiples [x] and [y] where $x=c \cdot e_i$ and $y=d \cdot e_j$ for some c,d∈ $\mathbb{F}$, i, j∈[1, 1], verify that i=j. This is realized as follows:

Protocol SamePos([x]; [y]):
1. Invoke $s_i$←RandomPublic( ) and $t_i$←RandomPublic( ) with non-zero $s_i$, $t_i$ for ∈[1, 1].
2. Locally compute [z]=([$z_1$], . . . , [$z_l$]), a new vector of sharings, where $z_i = s_i \cdot x_i + t_i \cdot y_i$.
3. Invoke p←UnitVectorMult([z]) and output p.

Square test. Given unit vector multiples [x] and [y] where $x=c \cdot e_i$ and $y=d \cdot e_i$ for some c, d, i. The functionality verifies that $d=y_i=x_i^2=c^2$. This is realized as follows:

Protocol SquareTest([x]; [y])
1. Locally compute $$[x'] = \left[\sum_{k=1}^{l} x_k\right] \text{ and } [y'] = \left[\sum_{k=1}^{l} y_k\right].$$

2. Run [x"] SMult([x'], [x']) and z←ZeroTest([x"−y']). Finally output z.

Given the functionalities above, it is easy to verify that a blinded message (M, M̂) is well formed, where M=(r, c) and M̂=(r̂,ĉ). The servers 104 of the AMB system 100 run the following protocol:

Protocol FormatTest(r, c, r̂, ĉ)
1. Randomize non-zero indices.
  Run (twice) $s_r$, $s_c$←RandomPublic(•).
  Run r←ShiftLeft(r, $s_r$), r̂←ShiftLeft(r̂, $s_r$), and c←ShiftLeft(c, $s_c$), ĉ←ShiftLeft(ĉ,$s_c$).
2. Verify a single non-zero. Run UnitVectorMult(•) on r and r̂ and abort if any execution returns 0.
3. Verify unit vectors. Run UnitVector(•) on c and ĉ and abort if any execution returns 0.
4. Verify same position. Run and $z_1$←SamePos(r, r̂) and $z_2$←SamePos(c,ĉ) and abort if $z_1$=0 or $z_2$=0.
5. Verify square. Run z←SquareTest(r, r̂), abort if z=0.

Protocol FormatTest verifies that the blinded message is exactly in the format, described above, assuming the shares in the blinded message are consistent. Verifying that the initial sharings of the blinded message are consistent is addressed next. If all verifications are passed, then the blinded message provided by the client is valid with a negligible probability of it being invalid.

A mechanism that prevents a server from blocking a client (e.g., based on its origin IP, geographical location, etc.) is necessary for an anonymous broadcast solution. In some settings, a server might block a client by simply claiming that it did not receive its message, which cause honest servers to discard their part of that client's message. This constitutes a passive attack, often without any mean of verifiability. This attack is possible in previous client-server based DC-net. In the AMB system 100 with n/4≤t<n/2, this attack is possible as well. The ramification of a client blocking attack is that a malicious adversary may obtain a full deanonymization capabilities. Consider an epoch, in which there are N clients in total, where 2≤H<N of them are honest. Unidentifiable client blocking allows the adversary to block H−1 honest clients and, clearly, deanonymize the last one. In an embodiment, the AMB system uses a protocol for client blocking prevention, while preserving information theoretically secure. Specifically, the AMB system 100 does not have to recede to computational security (using, e.g., commitment or digital signature scheme), as would naturally be expected. The description that follows will explicitly refer to the case where n/4≤t<n/2.

In the following, two input protocols to which the blocking attack is applicable are described, and then only one of them is further described as it is better fit the application of the AMB system 100. The more common input protocol is indirect, which works as follows: The servers first run r←RandomSecret(•). Then, for a client C to input m, each server $S_q$ sends its share $r_q$ to the client C, upon which, the client C computes r←Reconstruct([r]), computes δ=m−r and broadcasts δ to all servers. Finally, server $S_q$ computes $r'_q = r_q + \delta$, meaning that the servers now hold the sharing [r']=[r+δ]=[m]. This requires the servers to run RandomSecret, in an offline phase, for every input value to the computation, which has a constant overhead per input per server. In the AMB system, this amounts to an overhead of $O(N \cdot \sqrt{N} \cdot L)$, i.e., each client inputs a blinded message of size $O(\sqrt{N} \cdot L)$. As the nature of an anonymous broadcast system is continuous, it is preferable to have a meager offline phase. In a direct input protocol, on the other hand, to input m, a client C directly shares m to the servers using Share (m), by which server $S_q$ has $m_q$. Attacking the direct input protocol is advantageous for the AMB system 100 as it incurs no overhead in the offline phase. This, such mechanism is described below.

In the context of Shamir's TLSS, the degree of the polynomial by representing a share is referred to as the "share's degree". The attack stems from the fact that a reconstruction of a sharing of degree t by n=2t+1 parties, of which t might be corrupted, may be "inconsistent". That is, the shares (e.g., points) form a polynomial of degree>t. In the coding language, such an error can be detected by the honest servers, but not corrected. Hence, once given a client input sharing [m], the first task for the servers is to verify their shares ($m_1$, . . . , $m_n$) are consistent. Doing so without revealing m works by running the following protocol, to which server $S_q$ inputs its secret share $m_q$.

Protocol ConsistencyCheck($m_1$, . . . , $m_n$):
1. Run [r]←RandomSecret( ) and compute [s]←[m]+[r].
2. Run s'←Reconstruct([s]); output 0 if s'=⊥, 1 otherwise.

Notice that [r] is used as a one-time pad. The above can work exactly the same for a vector of input sharings rather than only a single one, which incurs the same cost (i.e., that still requires only a single sharing [r]).

The above protocol entails an elusive dilemma, if ConsistencyCheck($m_1$, . . . , $m_n$) returns 0, the honest servers do not know whether it is the client to blame or the malicious servers. That is, whether client C sent inconsistent shares $m_1$, . . . , $m_n$ in the first place, or that $m_1$, . . . , $m_n$ are consistent, but some servers input different shares to ConsistencyCheck. Concluding the former and discarding that message by the system means exactly a client-blocking attack by the malicious servers. Yet, concluding the latter and halting the system essentially means a client-initiated DoS attack (since the system 100 does not have robustness in the case of n/4≤t<n/2). Obviously, none of those options is acceptable.

To overcome that dilemma one could do one of the following: (1) reduce the system tolerance to collusion of corrupted servers; for instance, the above dilemma does not exists when t<n/4 as the servers have sufficient information for correcting an inconsistent sharing; (2) weaken the guarantee from information-theoretic to computational security, e.g., by using a signature scheme, then the servers/client could prove that they sent the correct message; and (3) allow further interaction between the client and servers (right now the client is non-interactive, namely it only has to send its blinded message without interacting anymore). In the following, the 3rd option is selected, i.e., a selection to preserve the information-theoretic security and introduce more rounds of interaction between the client and servers. A modified version of the consistency check protocol is integrated together with a protocol for re-sharing a secret, forming a fully secure input protocol. A protocol with t rounds of communication is described next.

t-Rounds Input Protocol. The modified consistency check protocol works as follows. Instead of only m, a client C also inputs a sharing of a random r, which serves as the one-time pad. A server $S_q$ now inputs both $m_q$ and $r_q$, as follows.

Protocol ConsistencyCheck2($m_1, \ldots, m_n$):
1. Run α←RandomPublic( ) and compute [s]←[m]+α[r].
2. Run s'←Reconstruct([s]); output 0 if s'=⊥, 1 otherwise The first observation is that ConsistencyCheck2 may be run by only a subset of the servers. When run by only t+1 servers, it is guaranteed that s'=⊥, since t+1 points must form a polynomial with degree at most t, as required for consistency. The input protocol of the AMB system 100 utilize this fact by iteratively eliminating servers from participating in the consistency check of a message m until reaching to a point in which ConsistencyCheck returns 1, which, as observed, always converges to this. When it converges, the current t'≥t+1 participants, denoted as H=$S_{p_1}, \ldots, S_{p_{t'}}$, re-share $m_{p_1}, \ldots, m_{p_{t'}}$ to the rest of the servers, denoted D={$S_q\}_{q\in[1,n]}$\H. The second observation is that, after the re-sharing procedure, if ($m_1, \ldots, m_n$) is inconsistent this is surely due to a server cheat and if Reconstruct outputs ⊥ in the format-verification protocol, the honest server can safely halt the system, knowing that it is a server-initiated (rather than a client initiated) DoS. Suppose that $\alpha_1, \ldots, \alpha_n \in$ $\mathbb{F}$ are distinct elements associated with $S_1, \ldots, S_n$, respectively, then a protocol is defined:

Protocol ReShare($m_{p_1}, \ldots, m_{p_{t'}}$):
1. Interpolate a degree t polynomial P(•) from points ($\alpha_{p_1}$, $m_{p_1}$), ... (m$\alpha_{p_{t'}}$, $m_{p_{t'}}$).
2. Evaluate $m_\beta \leftarrow P(\beta)$ for every β such that $S_\beta \in D$ and output $m_\beta$ to $S_\beta$.

The above protocol takes t'≥t+1 shares of parties in H, agreed to be consistent, and evaluates the polynomial they form to produce additional n−t' points for the parties in D. The evaluation on the additional points can be easily performed locally as this is a linear operation.

The input protocol is now formally described with initialized sets H=$S_1, \ldots, S_n$ and D∈∅.

Protocol Input(m):
1. C picks a uniform r and runs Share(m) and Share(r), by which, server $S_q$ holds $m_q, r_q$.
2. H run s'←ConsistencyCheck2($\{m_q, r_q\}_{q:S_q \in H}$).
   (a) If s'≠⊥ then run ReShare($\{m_q\}_{q:S_q \in H}$) and halt.
   (b) otherwise, C broadcasts a set D' (of cheating servers).
   The servers update D←D∪D' and H←H\D'.
   Run Step 2 again.

The above protocol relies on the observation that the client knows all secrets, namely, it knows $\{m_q, r_q\}_{q \in [1,N]}$ and α. Thus, it can report to the servers which server cheated in its input to ConsistencyCheck2. As mentioned above, when step 2 runs with H such that |H|=t+1, then ConsistencyCheck surely succeeds, then, a cheat in ReShare must be caused by a server, in which case it is okay to halt the system.

The above protocol may reach t rounds of communication in the worst case, when in each iteration only one corrupted party cheats with its input to ConsistencyCheck2. The ConsistencyCheck2 may be improved to reduce the maximum number of rounds to log t rounds, as described below.

Viewing the shares held by the n servers as a codeword in a [t+1, n]-RS code, it is well known that it is possible to detect up to n−t−1 errors, but more importantly, it is possible to correct up to (n−t−1)/2 errors using the Berlekamp-Welch algorithm. In the system 100, when n=2t+1, that means that it is possible to correct up to $$\left\lfloor \frac{t}{2} \right\rfloor$$

errors.

This improved ConsistencyCheck use and abstract the Berlekamp-Welch algorithm as follows:

Algorithm BW($s_1, \ldots, s'_n$):
1. Run the Berlekamp-Welch algorithm on $s_1, \ldots, s'_n$ and output s and D''.

The algorithm is given n'≥t+1 values $s_1, \ldots, s'_n \in \mathbb{F}$ and outputs s∈ $\mathbb{F}$ if decoding $s_1, \ldots, s'_n$ succeeds, which happens if there are at most $$t' = \frac{n'-t-1}{2}$$

errors or ⊥ otherwise. If the algorithm succeeds, then D'' contains servers' indices $\{S_{p^1}, \ldots, S_{p^r}\}$ such that $\{s_{p^1}, \ldots, s_{p^r}\}$ deviate from the t-degree polynomial agreed by the other n'−t' points. Otherwise, D''=⊥.

This leads to the following protocol, with initialized sets H=$S_1, \ldots, S_n$ and D''=∅.

Protocol Input(m):
1. C picks a uniform r and runs Share (m) and Share (r), by which, server $S_q$ holds $m_q, R_q$.
2. Each server $S_q \in H$ locally computes $s_q = m_q + \alpha \cdot r_q$ with α←RandomPublic( ).
3. Each server broadcasts $s_q$ and servers in H run H run s',D''←BW($\{s_q\}_{q:s_q \in H}$)
   (a) If s'=⊥ then update D←D∪D'' and H←H\D''.
       Run ReShare($\{m_q\}_{q:s_q \in H}$) and halt.
   (b) Otherwise, C broadcasts a set D' (of cheating servers).
       The servers update D←D∪D'' and H←H\D''.
       Finally, the servers in run Step 2 again.

Note that the "best strategy" for the adversary (i.e. the strategy that would cause the protocol to run with maximum number of rounds) is to corrupt more than $$\frac{|\mathcal{H}|-t-1}{2}$$

servers in each iteration. This leads to the BW algorithm to output s'=⊥ every time. However, this way the set of corrupted servers in H is cut by more than half in each iteration, meaning that the maximal number of rounds is log t.

It is now explained why a GPU is highly suitable for being utilized in the AMB system 100, in particular by the servers 104 of the system. A GPU consists of many cores, each of which is weak compared to a CPU. But, by deploying and performing a simple task on all cores the overall performance becomes much better than that of a CPU.

There are difficulties in breaking a big computational task to pieces and deploying it on a GPU due to the limited bandwidth of the bus between the CPU and the GPU. The representation of the computation initially resides at the CPU. In addition, the CPU needs to receive the results of the computation from the GPU and compile them to a single coherent output, which is then being further used in subsequent computations. This means that the representation of all sub-tasks, as well as the representation of the GPU's outputs are transferred from the CPU to the GPU and back. This information is transferred over a limited bus (e.g., PCI-e), and therefore, it must be quite compact to fit the limits of this bus.

Consider for example the task of computing the cartesian product of many pairs $(c_i, r_i)$ of vectors and receiving back the matrices $c_i \times r_i$ for all i. It is quite easy to deploy this task to a GPU such that each core is given a single pair of vectors, and instructed to compute the matrix $c_i \times r_i$ and hand it back to the CPU. This however, would not utilize the GPU to its full extent because the output size of each core is quadratic in its input size, which makes the CPU-GPU bus a sever bottleneck. On the other hand, the AMB system is not interested in the individual result of each product of vectors, but in the sum of all the resulting matrices. Thus, each core can compute one entry (or a small sub-matrix) of the matrices $c_i \times r_i$ for all i, and locally add the result to a local summation variable or sub-matrix that resides within the GPU. It only needs to send to the CPU the final result of the summation. In other words, each GPU core is given a range of α rows and β columns of all input vectors, and is responsible for computing a sub-matrix of size α×β of the final matrix, which is then transferred back to the CPU. This way, the total communication from all GPU cores to the CPU is equal to the size of just one matrix. This makes this approach feasible and even efficient, which was shown in experimental results.

Figure 2:
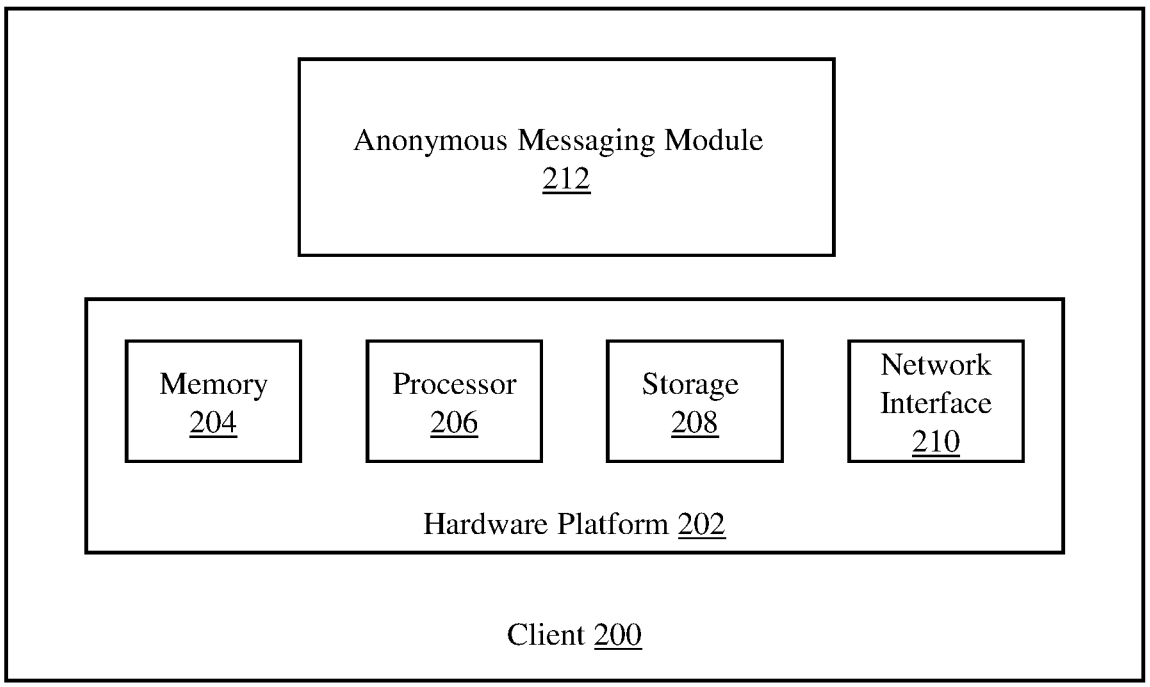
FIG. 2 is a block diagram of a client device that can be part of the AMB system in accordance with an embodiment of the invention.

Turning now to FIG. 2, an example of one of the clients 102 in the AMB system 100 in accordance with an embodiment of the invention is illustrated. As shown in FIG. 2, a client 200 has a physical hardware platform 202, which include components commonly found in a computer system. The physical hardware platform 202 includes at least one or more system memories 204, one or more processors 206, a storage 208, and a network interface 210. Each system memory 204, which may be random access memory (RAM), is the volatile memory of the client 200. Each processor 206 can be any type of a processor, such as a central processing unit (CPU) commonly used in computer systems. The storage 208 can be any type of non-volatile computer storage with one or more storage devices, such as a solid-state devices (SSDs) and hard disks. Although the storage 208 is shown in FIG. 2 as being a local storage, in other embodiments, the storage 208 may be a remote storage, such as a network-attached storage (NAS) or cloud-based storage. The network interface 210 is an interface that allows the client 200 to communicate with other devices, such as the servers 104 of the AMB system 100, through one or more computer networks. As an example, the network interface may be a network interface controller (NIC).

The client 200 can be any type of a computer system that can connect to the Internet. Thus, in some embodiments, the client 200 may be a personal computer or a personal virtual computer, such as a virtual machine. In other embodiments, the client 200 may be a mobile device, such as a smartphone.

The client 200 further includes an anonymous messaging module 212, which executes various operations to send messages to the servers 104 to be broadcasted, as previously described. As an example, the anonymous messaging module 212 may execute the following operations to secretly transmit a message m to the servers 104 in the AMB system 100: randomly pick $(i^*, j^*)$; prepare vectors r and c by assigning $c_{i^*}=1$, and $c_i=0$ for every $i \neq i^*$ and assigning $r_{j^*}=m$, and $r_j=0$ for every $j \neq j^*$; prepare vectors $\hat{r}$ and $\hat{c}$ by assigning $\hat{c}_{i^*}=1$, and $\hat{c}_i=0$ for every $i \neq i^*$ and assigning $\hat{r}_{j^*}=m^2$, and $\hat{r}_j=0$ for every $j \neq j^*$; and share the vectors r, c, $\hat{r}$ and $\hat{c}$ to all the servers 104 using a threshold secret sharing scheme. The anonymous messaging module 212 may also execute operations related to client blocking prevention.

Figure 3:
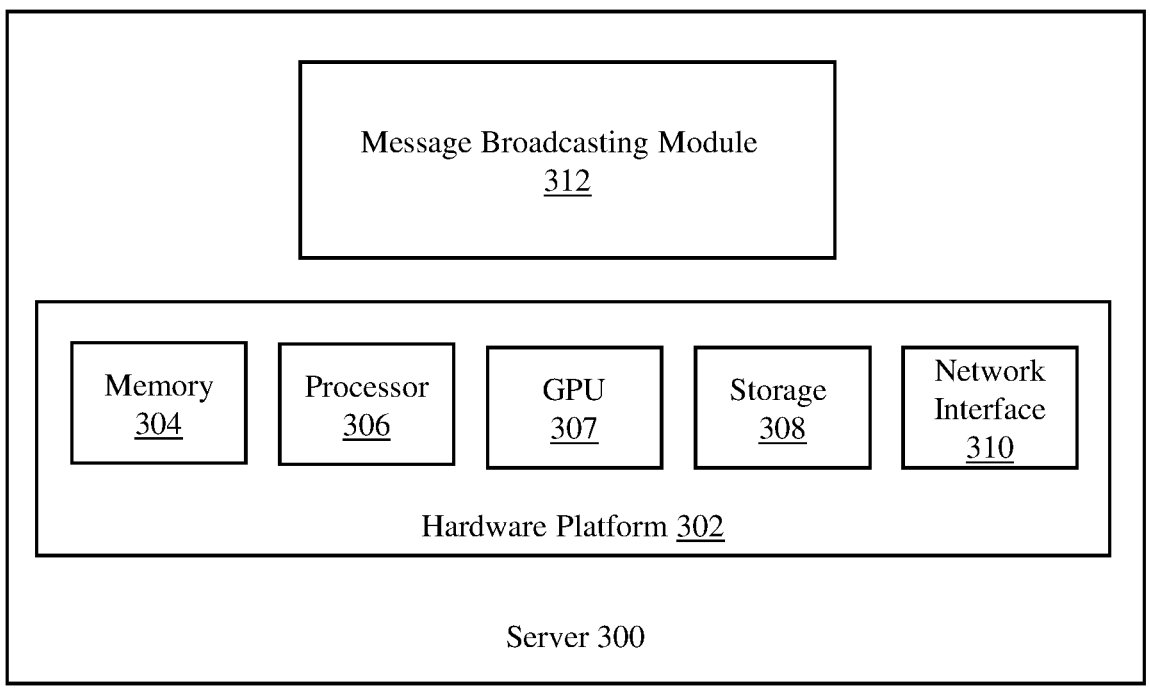
FIG. 3 is a block diagram of a message broadcasting server that can be part of the AMB system in accordance with an embodiment of the invention.

Turning now to FIG. 3, an example of one of the servers 104 in the AMB system 100 in accordance with an embodiment of the invention is illustrated. As shown in FIG. 3, a server 300 has a physical hardware platform 302, which include components commonly found in a server-grade computer system. The physical hardware platform 302 includes at least one or more system memories 304, one or more processors 306, one or more graphics processing units (GPUs) 307, a storage 308, and a network interface 310. Each system memory 304, which may be random access memory (RAM), is the volatile memory of the server 300. Each processor 306 can be any type of a processor, such as a central processing unit (CPU) commonly used in computer systems. Each GPU 307 can be any type of a graphics processor. The storage 308 can be any type of non-volatile computer storage with one or more storage devices, such as a solid-state devices (SSDs) and hard disks. Although the storage 308 is shown in FIG. 3 as being a local storage, in other embodiments, the storage 308 may be a remote storage, such as a network-attached storage (NAS) or cloud-based storage. The network interface 310 is an interface that allows the server 300 to communicate with other devices, such as the clients 102 and other servers 104 of the AMB system 100, through one or more computer networks. As an example, the network interface may be a network interface controller (NIC).

The server 300 further includes a message broadcasting messaging module 312, which executes various operations to receive and process the vectors r, c, $\hat{r}$ and $\hat{c}$ from each of the clients 102 and to broadcast the messages. As an example, the message broadcasting messaging module 312 may execute the following operations to process the vectors from the clients 102: for each set of vectors r, c, $\hat{r}$ and $\hat{c}$ from a client, perform format verification of the vectors; construct the matrix M by multiplying the vectors r and c; construct the matrix $\hat{M}$ by multiplying the vectors $\hat{r}$ and $\hat{c}$; update the matrix A by adding the matrix M to the matrix A; update the matrix $\hat{A}$ by adding the matrix $\hat{M}$ to the matrix $\hat{A}$; at the end of an epoch, share the matrices A and $\hat{A}$ with all the servers 104, construct final matrices A and $\hat{A}$ using the shared matrices A and $\hat{A}$ from all the other servers; and broadcast the messages contained in the final matrix A. The message broadcasting messaging module 312 may also execute operations related to client blocking prevention. All the matrices used by the server 300 may be stored in the storage 308. As an example, the message may be broadcasted by publishing the messages in one or more public websites and/or transmitting the messages to social or new entities.

The server 300 can be any type of a computer system that can connect to the Internet. Thus, in some embodiments, the server 300 may be a computer system, such as a physical server or a virtual computer, such as a virtual machine.

Figure 4:
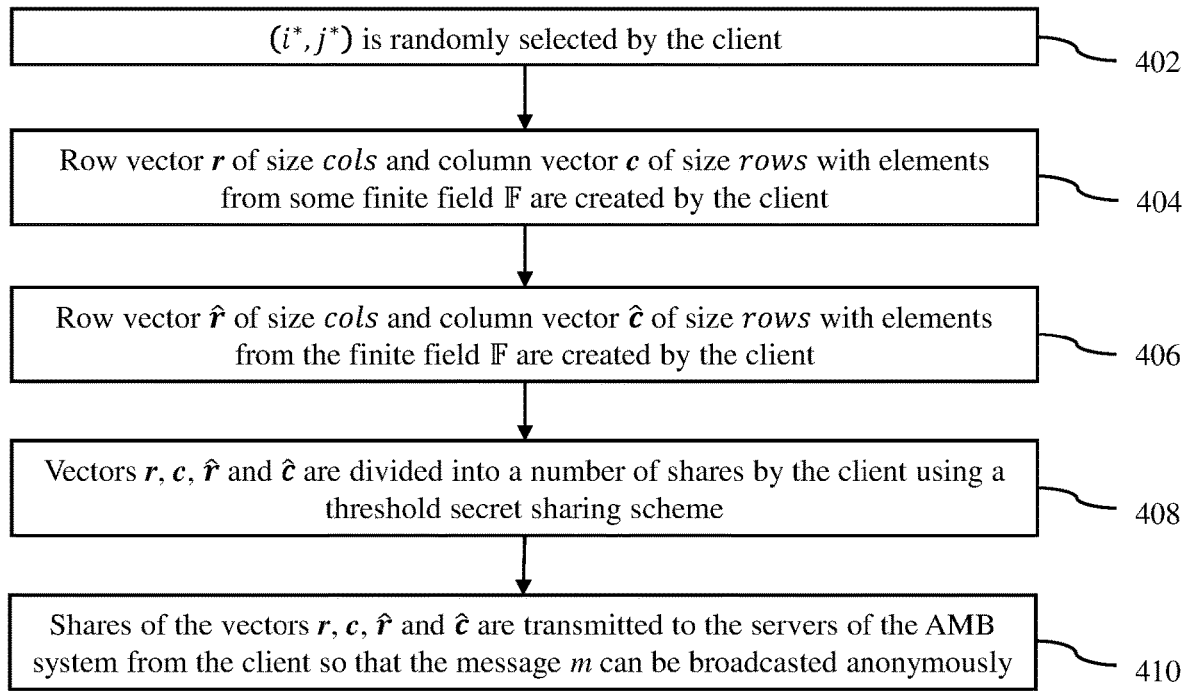
FIG. 4 is a flow diagram of an operation of a client device in the AMB to transmit a message to the message broadcasting servers of the AMB system in accordance with an embodiment of the invention.

An operation of a client 102 in the AMB system 100 to transmit a message to the servers 104 of the system 100 in accordance with an embodiment of the invention is described with reference to a flow diagram of FIG. 4. At block 402, ($i^*,j^*$) is randomly selected by the client, where $i^*$ is a particular i value that indicates the particular row of a matrix M and $j^*$ is a particular j value that indicates the particular column of the matrix M.

Next, at block 404, a row vector r of size cols and a column vector c of size rows with elements from some finite field $\mathbb{F}$ are created by the client by assigning $c_{i^*}=1$, and $c_i=0$ for every $i\neq i^*$, and assigning $r_{j^*}=m$, and $r_j=0$ for every $j\neq j^*$. Thus, the row vector r includes all zeros, except one non-zero value, $m^2$, at $i^*$, and the column vector c includes all zeros, except one non-zero value (i.e., 1) at $j^*$. Note, that $\hat{c}\times\hat{r}$ is equal to the matrix $\hat{M}$ with all zero entries, except $m^2$ at ($i^*,j^*$).

Next, at block 406, a row vector r̂ of size cols and a column vector ĉ of size rows with elements from the finite field $\mathbb{F}$ are created by the client by assigning $\hat{c}_{i^*}=1$, and $\hat{c}_i=0$ for every $i\neq i^*$, and assigning $\hat{r}_{j^*}=m^2$, and $\hat{r}_j=0$ for every $j\neq j^*$. Thus, the row vector r̂ includes all zeros, except one non-zero value, $m^2$, at $i^*$, and the column vector c includes all zeros, except one non-zero value (i.e., 1) at $j^*$. Note, that $\hat{c}\times\hat{r}$ is equal to the matrix $\hat{M}$ with all zero entries, except $m^2$ at ($i^*,j^*$).

Next, at block 408, the vectors r, c, r̂ and ĉ are divided into a number of shares by the client using a threshold secret sharing scheme, such as Shamir's threshold secret sharing scheme.

Next, at block 410, the shares of the vectors r, c, r̂ and ĉ are transmitted to the servers 104 of the AMB system 100 from the client so that the message m can be broadcasted anonymously.

Figure 5:
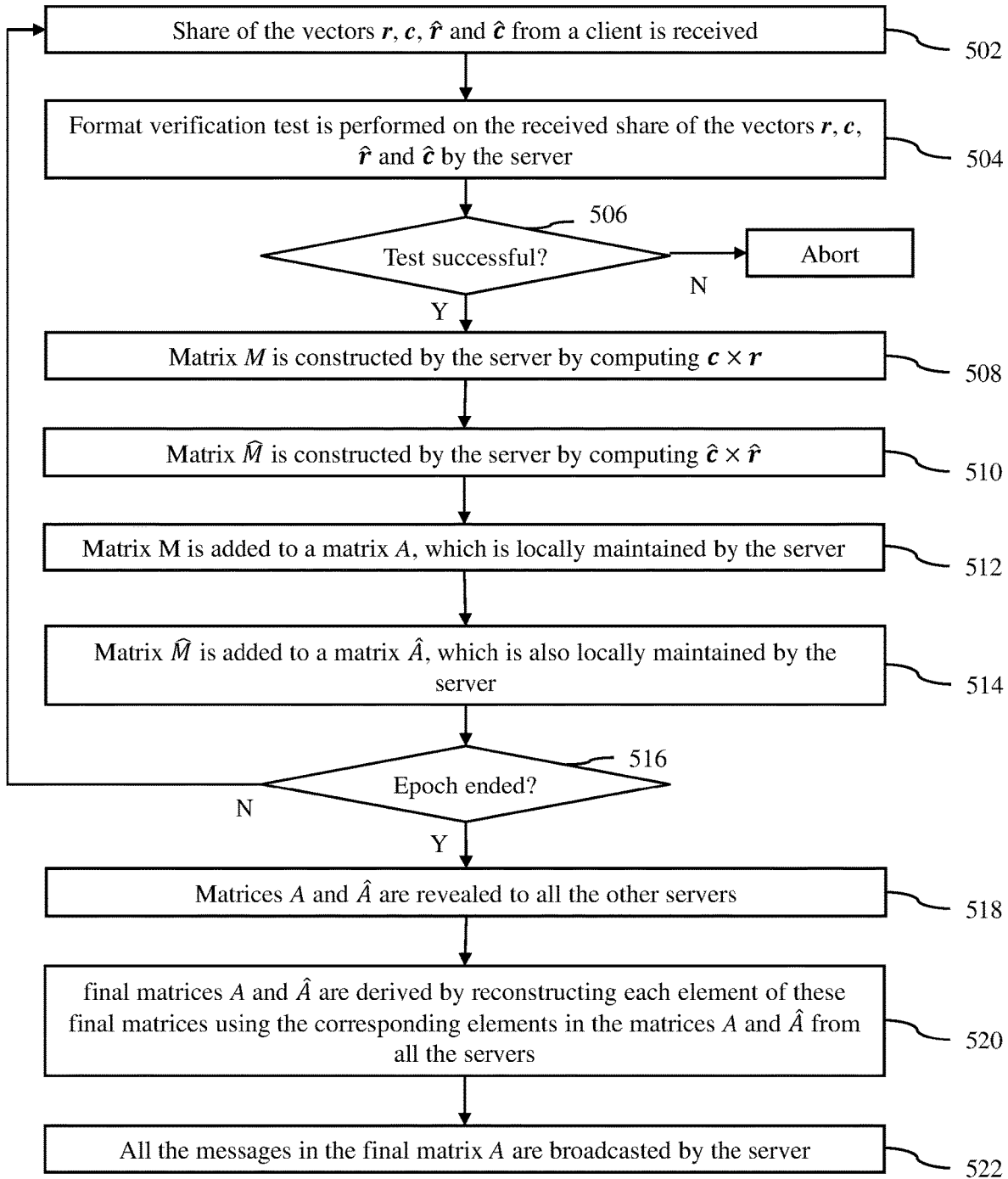
FIG. 5 is a flow diagram of an operation of a server in the AMB system for one epoch in accordance with an embodiment of the invention.

An operation of a server 104 in the AMB system 100 for one epoch in accordance with an embodiment of the invention is described with reference to a flow diagram of FIG. 5. At block 502, a share of the vectors r, c, r̂ and ĉ from a client 102 is received.

Next, at block 504, a format verification test is performed on the received share of the vectors r, c, r̂ and ĉ by the server. In an embodiment, the format verification test involves randomizing non-zero indices the received vectors r, c, r̂ and ĉ, which involves executing RandomPublic(•) operation to derive two values, $s_r$, and $s_c$ and executing ShiftLeft operation on each of the received vectors r, c, r̂ and ĉ, i.e., r←ShiftLeft(r, $s_r$), r̂←ShiftLeft(r̂, $s_r$), and c←ShiftLeft(c, $s_c$), ĉ←ShiftLeft(ĉ, $s_c$). The format verification test also involves verifying a single non-zero value in the received vectors r and r̂ by executing UnitVectorMult operation on the received vectors r and r̂. The format verification test also involves verifying that the received vectors c and ĉ are unit vectors by executing UnitVector operation on the received vectors c and ĉ. The format verification test further involves verifying that the non-zero values are in the same position for the received vectors r and r̂ and for the received vectors c and ĉ. Lastly, the format verification test involves verifying that one of the non-zero values in the received vectors r and r̂ is a square of the other value.

Next, at block 506, a determination is made whether the format verification test was successful. If yes, then the operation proceeds to block 508. If no, then the operation is aborted.

Next, at block 510, the matrix M is constructed by the server by computing c×r. Similarly, at block 512, the matrix M̂ is constructed by the server by computing ĉ×r̂.

Next, at block 514, the matrix M is added to a matrix A, which is locally maintained by the server. Similarly, at block 510, the matrix M̂ is added to a matrix Â, which is also locally maintained by the server.

Next, at block 516, a determination is made whether the current epoch has ended. If yes, then the operation proceeds to block 518. If no, then the operation proceeds to block 502 to process a share of the vectors r, c, r̂ and ĉ from another client, if any.

At block 518, the matrices A and Â of the server are revealed to all the other servers 104 of the AMB system 100. This is part of a process where all the servers reveal or share their matrices A and Â to all the other servers.

Next, at block 520, final matrices A and Â are derived by reconstructing each element of these reconstructed matrices using the corresponding elements in the matrices A and Â from all the servers. The reconstructed matrix A includes all the messages (i.e., m's) from all the clients that sent shares of their messages using the vectors r, c, r̂ and ĉ. The reconstructed matrix Â includes $m^2$ values that correspond to the messages from all the clients. In an embodiment, the elements of reconstructed matrices A and Â are reconstructed using the Reconstruct operation.

Next, at block 522, all the messages in the final matrix A are broadcasted by the server. This is part of a process where all the servers broadcast all the messages in each of their respective final matrix A's.

Figure 6:
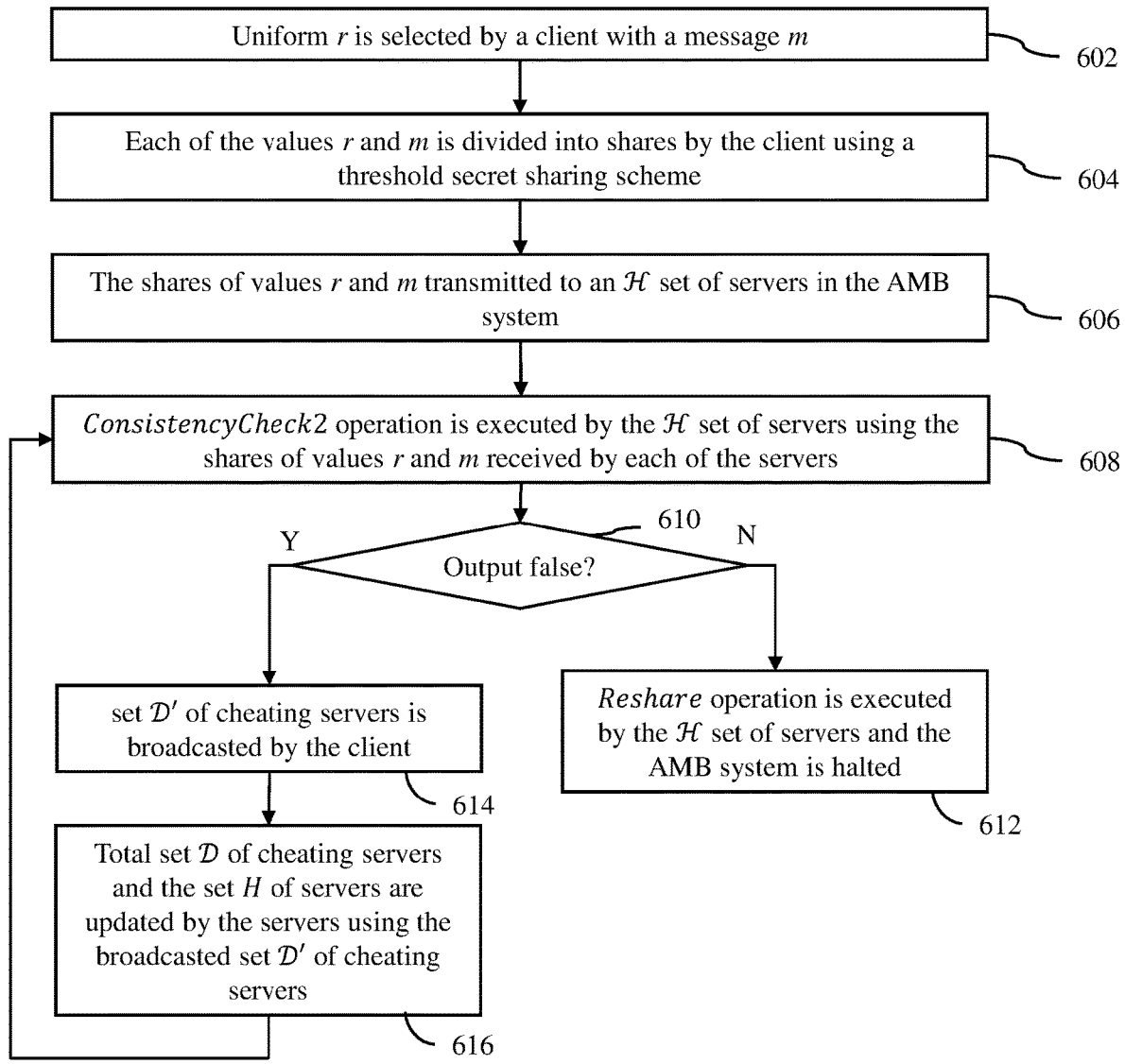
FIG. 6 is a flow diagram of an operation of the AMB system to prevent client blocking in accordance with an embodiment of the invention.

In some embodiments, the AMB system 100 may further include a client blocking prevention mechanism. An operation of the AMB system 100 to prevent client blocking in accordance with an embodiment of the invention is described with reference to a flow diagram of FIG. 6. At block 602, a uniform r is selected by a client 102 with a message m. Next, at block 604, each of the values r and m is divided into shares by the client using a threshold secret sharing scheme, such as Shamir's threshold secret sharing scheme. In an embodiment, the values r and m are divided into shares using Share(m) and Share(r) operations.

Next, at block 606, the shares of values r and m transmitted to an H set of servers 104 in the AMB system 100. Next, at block 608, the ConsistencyCheck2 operation is executed by the H set of servers using the shares of values r and m received by each of the servers. In an embodiment, each server of the H set inputs its shares into the ConsistencyCheck2 operation.

Next, at block 610, a determination is made by the H set of servers 104 whether the output of the ConsistencyCheck2 operation is not false (i.e., not ⊥). If it is not false, then the operation proceeds to block 612, where the Reshare operation is executed by the H set of servers and the anonymous broadcast system 100 is halted. If it is false, then the operation proceeds to block 614.

At block 614, a set D' of cheating servers is broadcasted by the client. Next, at block 616, the total set D of cheating servers and the set H of servers are updated by the servers using the broadcasted set D' of cheating servers, i.e., D←D∪D' and H←H\D'. The operation then proceeds back to block 608 until the output of the ConsistencyCheck2 operation is not false.

Figure 7:
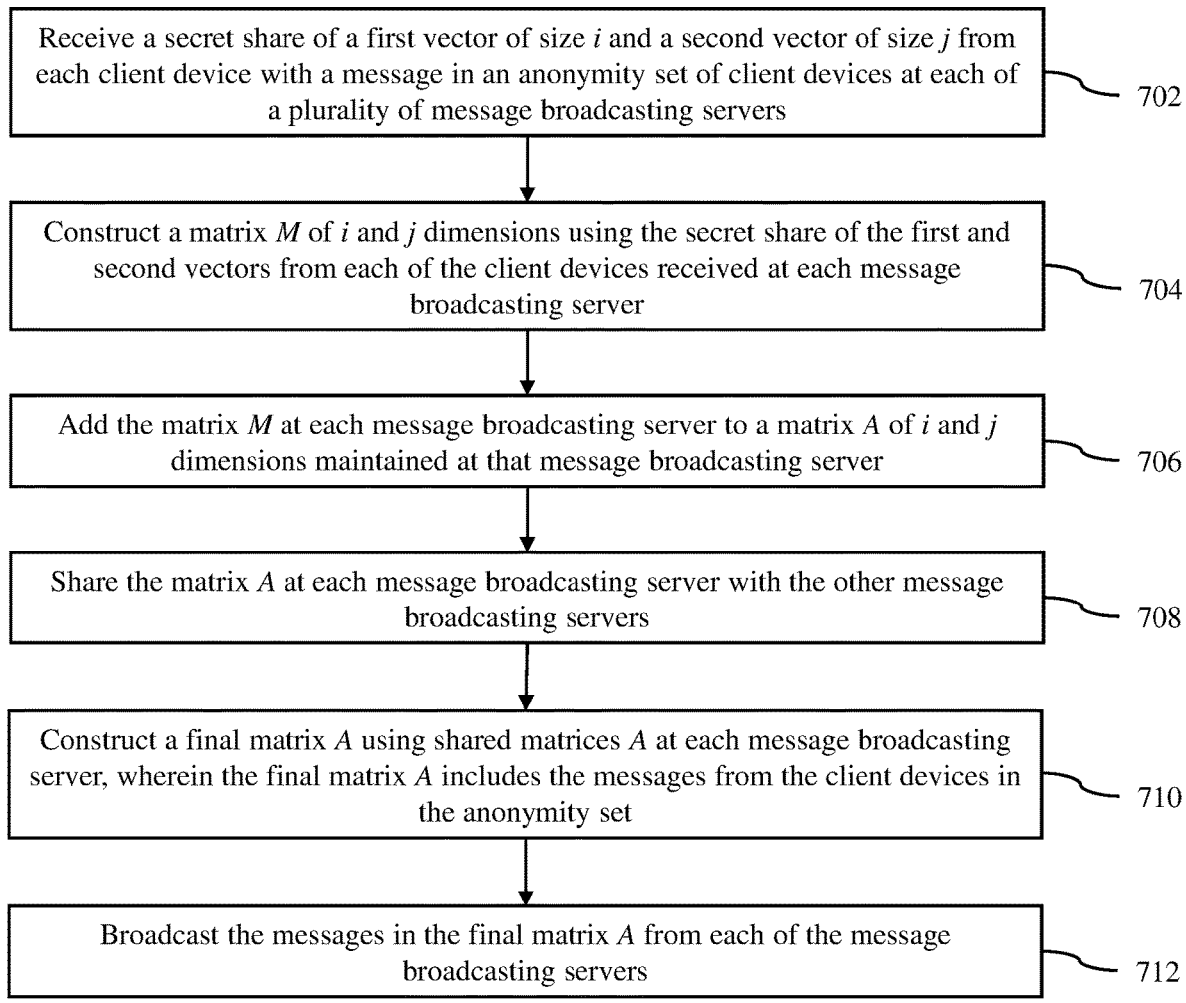
FIG. 7 is a flow diagram of a computer-implemented method for anonymous message broadcasting in accordance with an embodiment of the invention.

A computer-implemented method for anonymous message broadcasting in accordance with an embodiment of the invention is described with reference to a flow diagram of FIG. 7. At block 702, a secret share of a first vector of size i and a second vector of size j from each client device with a message in an anonymity set of client devices is received at each of a plurality of message broadcasting servers. These first and second vectors from each client device contain the message from that client device. At block 704, a matrix M of i and j dimensions is constructed using the secret share of the first and second vectors from each of the client devices received at each message broadcasting server. At block 706, the matrix M at each message broadcasting server is added to a matrix A of i and j dimensions maintained at that message broadcasting server. At block 708, the matrix A at each message broadcasting server is shared with the other message broadcasting servers. At block 710, a final matrix A is constructed using shared matrices A at each message broadcasting server, wherein the final matrix A includes the messages from the client devices in the anonymity set. At block 712, the messages in the final matrix A are broadcasted from each of the message broadcasting servers.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for anonymous message broadcasting, the method comprising:

receiving a secret share of a first vector of size i and a second vector of size j from each client device with a message in an anonymity set of client devices at each of a plurality of message broadcasting servers, the first and second vectors from each client device containing the message from that client device;

constructing a matrix M of i and j dimensions using the secret share of the first and second vectors from each of the client devices received at each message broadcasting server;

adding the matrix M at each message broadcasting server to a matrix A of i and j dimensions maintained at that message broadcasting server;

sharing the matrix A at each message broadcasting server with the other message broadcasting servers;

constructing a final matrix A using shared matrices A at each message broadcasting server, wherein the final matrix A includes the messages from the client devices in the anonymity set; and broadcasting the messages in the final matrix A from each of the message broadcasting servers.

2. The method of claim 1, further comprising receiving a secret share of a third vector of size i and a fourth vector of size j from each client device in the anonymity set of client devices at each of the plurality of message broadcasting servers, the third and fourth vectors from each client device containing a square of the message from that client device.

3. The method of claim 1, wherein the secret share of the first vector of size i and a second vector of size j from each client device is a secret share derived using a Shamir's threshold secret sharing scheme and wherein the final matrix A is constructed using a reconstruction operation of the Shamir's threshold secret sharing scheme.

4. The method of claim 1, further comprising executing format verification on each of the first and second vectors.

5. The method of claim 4, wherein the format verification includes a unit vector multiple test on the second vector to verify that the second vector includes zeroes and only one non-zero value.

6. The method of claim 5, further comprising receiving a secret share of a third vector of size i and a fourth vector of size j from each client device in the anonymity set of client devices at each of the plurality of message broadcasting servers, the third and fourth vectors from each client device containing a square of the message from that client device, wherein the format verification includes a square test on the second and fourth vector to verify that the fourth vector includes a non-zero value that is a square of the non-zero value included in the second vector.

7. The method of claim 4, wherein the format verification includes a unit vector test on the first vector to verify that the first vector includes zeroes and only one non-zero value of one (1).

8. The method of claim 1, further comprising performing a client blocking prevention process by verifying shares of a message from a client received by the message broadcasting servers are consistent and removing any message broadcasting servers that is determined to be malicious from being involved in the anonymous message broadcasting.

9. A non-transitory computer-readable storage medium containing program instructions for method for anonymous message broadcasting, wherein execution of the program instructions by one or more processors of a computer causes the one or more processors to perform steps comprising:

receiving a secret share of a first vector of size i and a second vector of size j from each client device with a message in an anonymity set of client devices at each of a plurality of message broadcasting servers, the first and second vectors from each client device containing the message from that client device;

constructing a matrix M of i and j dimensions using the secret share of the first and second vectors from each of the client devices received at each message broadcasting server;

adding the matrix M at each message broadcasting server to a matrix A of i and j dimensions maintained at that message broadcasting server;

sharing the matrix A at each message broadcasting server with the other message broadcasting servers;

constructing a final matrix A using shared matrices A at each message broadcasting server, wherein the final matrix A includes the messages from the client devices in the anonymity set; and broadcasting the messages in the final matrix A from each of the message broadcasting servers.

10. The computer-readable storage medium of claim 9, wherein the steps further comprise receiving a secret share of a third vector of size i and a fourth vector of size j from each client device in the anonymity set of client devices at each of the plurality of message broadcasting servers, the third and fourth vectors from each client device containing a square of the message from that client device.

11. The computer-readable storage medium of claim 9, wherein the secret share of the first vector of size i and a second vector of size j from each client device is a secret share derived using a Shamir's threshold secret sharing scheme and wherein the final matrix A is constructed using a reconstruction operation of the Shamir's threshold secret sharing scheme.

12. The computer-readable storage medium of claim 9, wherein the steps further comprise executing format verification on each of the first and second vectors.

13. The computer-readable storage medium of claim 12, wherein the format verification includes a unit vector multiple test on the second vector to verify that the second vector includes zeroes and only one non-zero value.

14. The computer-readable storage medium of claim 13, further comprising receiving a secret share of a third vector of size i and a fourth vector of size j from each client device in the anonymity set of client devices at each of the plurality of message broadcasting servers, the third and fourth vectors from each client device containing a square of the message from that client device, wherein the format verification includes a square test on the second and fourth vector to verify that the fourth vector includes a non-zero value that is a square of the non-zero value included in the second vector.

15. The computer-readable storage medium of claim 12, wherein the format verification includes a unit vector test on the first vector to verify that the first vector includes zeroes and only one non-zero value of one (1).

16. The computer-readable storage medium of claim 9, wherein the steps further comprise performing a client blocking prevention process by verifying shares of a message from a client received by the message broadcasting servers are consistent and removing any message broadcasting servers that is determined to be malicious from being involved in the anonymous message broadcasting.

17. A message broadcasting server comprising:
memory; and
at least one processor configured to:
receive a secret share of a first vector of size i and a second vector of size j from each client device with a message in an anonymity set of client devices, the first and second vectors from each client device containing the message from that client device;
constructing a matrix M of i and j dimensions using the secret share of the first and second vectors from each of the client devices;
adding the matrix M to a matrix A of i and j dimensions maintained by the message broadcasting server;
sharing the matrix A with other message broadcasting servers;
constructing a final matrix A using shared matrices A from the message broadcasting server and the other message broadcasting servers, wherein the final matrix A includes the messages from the client devices in the anonymity set; and
broadcasting the messages in the final matrix A in conjunction with the other message broadcasting servers.

18. The message broadcasting server of claim 17, wherein the at least one processor is configured to receive a secret share of a third vector of size i and a fourth vector of size j from each client device in the anonymity set of client devices, the third and fourth vectors from each client device containing a square of the message from that client device.

19. The message broadcasting server of claim 17, wherein the at least one processor is configured to execute format verification on each of the first and second vectors, wherein the format verification includes a unit vector multiple test on the second vector to verify that the second vector includes zeroes and only one non-zero value.

20. The message broadcasting server of claim 19, wherein the format verification further includes a unit vector test on the first vector to verify that the first vector includes zeroes and only one non-zero value of one (1).

* * * * *